United States Patent [19]
Rooks et al.

[11] 3,964,676
[45] June 22, 1976

[54] ELECTRONIC MORNING START-UP CONTROL FOR A BUILDING TEMPERATURE CONTROL SYSTEM

[75] Inventors: Albert H. Rooks; Everette E. Vermilion, both of Seattle, Wash.

[73] Assignee: Albert H. Rooks, Seattle, Wash.

[22] Filed: Sept. 30, 1974

[21] Appl. No.: 510,490

[52] U.S. Cl.................................. 236/46 R; 236/47
[51] Int. Cl.² ............................................. F23N 5/20
[58] Field of Search............................. 236/46, 47; 337/301–302, 303; 219/492

[56] References Cited
UNITED STATES PATENTS

| | | | |
|---|---|---|---|
| 2,604,267 | 7/1952 | Smith.................................... | 236/46 |
| 2,832,870 | 4/1958 | Kucera............................... | 236/46 X |
| 3,317,692 | 5/1967 | Duncan............................... | 337/301 |

Primary Examiner—William E. Wayner
Attorney, Agent, or Firm—Christensen, O'Connor, Garrison & Havelka

[57] ABSTRACT

An electronic control system for limiting the energy used for building temperature control during unoccupied hours and efficiently bringing the building temperature to a predetermined level at the time occupancy commences is disclosed. A cyclic clock starts a fixed period auxiliary timer a predetermined time period before building occupancy is to commence. The output of the auxiliary timer is electronically modified and compared with an electronically modified temperature signal related to either the environment surrounding the building (for heating systems) or the environment inside the building (for cooling systems). The result of the comparison is used to control the building's heating and/or cooling system in a manner such that the temperature of the building is raised or lowered to a predetermined level when occupancy commences.

30 Claims, 13 Drawing Figures

ELECTRONIC MORNING START-UP CONTROL FOR A BUILDING TEMPERATURE CONTROL SYSTEM

BACKGROUND OF THE INVENTION

This invention is related to control systems, and, more particularly, to morning start-up control systems for controlling the temperature control system of a building.

Many buildings, such as office buildings, schools, factories and the like are only occupied during certain hours of the day, certain days of the week. During these "occupied" hours, it is desirable that the internal temperature of these buildings be maintained at some predetermined comfortable level. On the other hand, it is inefficient from an energy conservation point of view for the temperature of such buildings to be maintained at a comfortable level during the hours that they are unoccupied. For this reason, the internal temperatures of such buildings are allowed to fluctuate from a comfortable level during unoccupied periods by resetting the building's thermostat or by turning the building's heating and/or cooling system off. In cooler climates the "night" setting allows the building's temperature to drop and in warmer climates it allows the building's temperature to rise. Because the building temperature is allowed to fluctuate during unoccupied periods, it is necessary to bring the building's temperature back to a comfortable level by the time occupancy is to commence. Obviously, a time delay is involved in this process because a building's temperature cannot be raised or lowered instantaneously.

In the past, fixed period timers have been used to switch a building's heating and/or cooling system from a night setting to a "day" setting some fixed period of time prior to occupancy. In this manner the building temperature is brought to a comfortable level prior to occupancy. The period of time between switching from the night setting until the day comfort temperature level is reached is commonly referred to as the morning start-up period.

There are, obviously, a number of disadvantages to a fixed morning start-up period. For example, if the morning start-up period begins too early, energy is wasted because the building is brought to the desired temperature level well prior to occupancy. Alternatively, if the morning start-up period begins too late, the occupants will be uncomfortable because the building will not be at the desired temperature level when occupancy commences.

At this point it should be noted that the desired morning start-up period (desired meaning the minimum time necessary to bring the building's temperature to a desired level at the precise time occupancy commences) is not a fixed period of time. Rather, it varies from day-to-day, depending on external temperature and wind conditions, and the construction and insulation parameters of a particular building, because all of these elements determine the amount of temperature fluctuation (i.e. heat loss or gain) that will occur during the unoccupied periods and the amount of time it will take for the building's temperature to be brought to a comfortable level from any other level.

In the past, temperature sensors have been used to control the morning start-up period on a day-to-day basis. One such prior art system is described in U.S. Pat. No. 3,317,692 issued May 2, 1967 to James L. Duncan, for Ambient Temperature-Modified, Temperature-Altering Control Mechanism. While systems of the nature described in this patent are a step forward from fixed morning start-up period systems, they still have a number of disadvantages. For example, these systems are basically mechanical in nature. Thus, they are subject to mechanical failures. Further, these systems use temperature sensitive devices that are relatively imprecise. More specifically, these systems preferably use temperature sensitve devices whose position or tension is related to temperature. Because these devices are constantly tensed, they rapidly deteriorate with age. As they deteriorate, their temperature/mechanical force relationship varies from a nominal value. Finally, mechanical systems of this nature are difficult to precisely adjust to compensate for different building parameters. In fact, most such systems cannot be adjusted to compensate for such parameters.

Therefore, it is an object of this invention to provide a new and improved building temperature control system.

It is a further object of this invention to provide a variable morning start-up period control suitable for use in controlling the heating and/or cooling system of a building that is reliable and long lasting.

It is a still further object of this invention to provide a new and improved morning start-up building temperature control that is formed mainly of electronic components and, therefore, easily adjusted and reliable.

SUMMARY OF THE INVENTION

In accordance with principles of this invention, an electronic control for efficiently controlling the energy used for building heating and/or cooling by efficiently controlling the morning start-up period is provided. The morning start-up control limits the energy used for building temperature control during unoccupied hours and efficiently controls the morning start-up period in a manner such that the building's temperature is at a predetermined level when daily occupancy commences. The preferred form of the invention includes a cyclic clock that starts a fixed period auxiliary timer a predetermined time period before building occupancy is to commence. The output of the auxiliary timer is electronically modified and compared with an electronic modified temperature signal related to either the environment surrounding the buildiing or the environment inside of the building. The result of the comparison is used to control the heating and/or cooling system of the building in a manner such that the temperature of the building is at a predetermined level when occupancy commences.

In accordance with other principles of this invention, the cyclic clock is a seven day clock and the fixed period auxiliary timer includes a motor adapted to rotate a linear potentiometer through a single cycle each time the motor is energized. The linear potentiometer output is connected so as to maintain the motor energized for a complete cycle subsequent to initial energization by the cyclic clock, once each day. In addition, the output of the linear potentiometer (which is a time related signal) is electronically conditioned by a discontinuous linear time generator to create a modified time signal.

In accordance with further principles of this invention, the environment surrounding the building is sensed by an outdoor wind/temperature sensor. Preferably, the wind/temperature sensor is a cooling effect detector that comprises a heater and a temperature sensitive resistor. The output of the outdoor wind/temperature sensor is applied to a first temperature generator adapted to produce a signal which is roughly, inversely linear to its input. The output of the first temperature generator is electronically modified by a second temperature generator in an exponential manner to produce a modified outdoor temperature signal. The modified outdoor temperature signal is electronically compared with the modified time signal and the result of the comparison is utilized to control the switching of the building's heating system from a night mode of operation to a day mode of operation.

In accordance with yet other principles of this invention, the environment inside of the building is sensed by an indoor temperature sensor, preferably a temperature sensitive resistor. The output of the indoor temperature sensor is applied to a third temperature generator adapted to produce a signal which is roughly, inversely linear to its input. The output of the third temperature generator is electronically modified by a fourth temperature generator in an inversely linear manner (or an exponential manner, if desired) to produce a modified indoor temperature signal. The modified indoor temperature signal is electronically compared with the modified time signal and the result of the comparison is utilized to control the switching of the building's cooling system from a night mode of operation to a day mode of operation.

In accordance with still further principles of this invention, the cyclic clock is adapted to produce a further signal once each week (on Monday morning) adapted to modify the discontinuous linear time generator in a manner such that it modifies the output of the linear potentiometer in a manner that extends the usual morning start-up period. Further, the seven day clock generates an override signal adapted to override the output of the comparator should it not provide a switching signal prior to occupancy actually occurring. In addition, switches are provided for overriding the entire system, when and if desired. Moreover, certain of the generators include signal adjustment means (e.g. potentiometers) that allow these circuits to be readily adjusted to compensate for various factors, such as building insulation, for example.

It will be appreciated from the foregoing summary that the invention provides an electronic control adapted to control a building's temperature control system. Because it is electronic, it is reliable and readily modified to compensate for a building's parameters so that it will correctly control the building's temperature control system in the desired manner. That is, the electronic nature of the invention allows it to be readily modified to compensate for building size, insulation characeristics, mass, location, etc. Hence, the invention is readily "customized" for a particular installation. Moreover, the invention is readily adapted to compensate for minor variations which may develop between the components utilized in particular embodiments of the invention. Further, because the invention is substantially entirely electronic, it is more reliable than prior art systems, particularly those of an entirely mechanical or substantially entirely mechanical nature.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
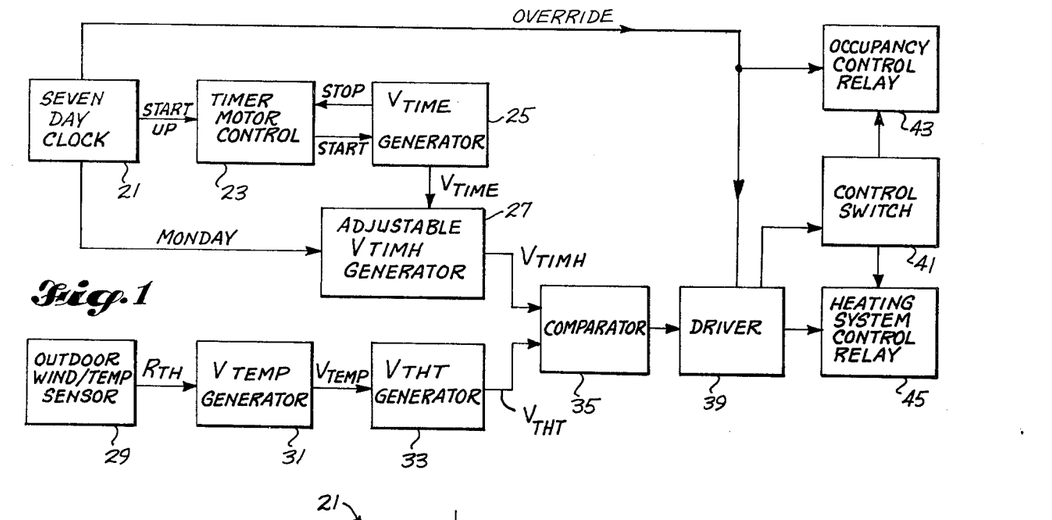
FIG. 1 is a block diagram of a preferred embodiment of the invention suitable for controlling the heating system of a building.

FIG. 1 is a block diagram illustrating a preferred embodiment of the present invention and comprises: a seven day clock 21; a timer motor control 23; a $V_{TIME}$ generator 25; an adjustable $V_{TIMH}$ generator 27; an outdoor wind/temperature sensor 29; a $V_{TEMP}$ generator 31; a $V_{THT}$ generator 33; a comparator 35; a driver 39; a control switch 41; an occupancy control relay 43; and a heating system control relay 45.

The seven day clock 21 is a standard timeclock of the type frequently used to change a building's heating (or cooling) system from a day setting to a night setting and vice versa. The clock includes a motor and a gearing arrangement plus position adjustable trippers adapted to open or close switches at user selected times of the day. The invention modifies the standard timeclock by adding a switch that applies a signal to the timer motor control 23 some fixed period prior to occupancy, seven hours, for example. At this point, it should be noted that the seven day clock 21 could be replaced by a 24 hour clock if the building occupancy schedule is the same each day.

Figures 4, 5, 6, 7, 8, 9, 10, 11:
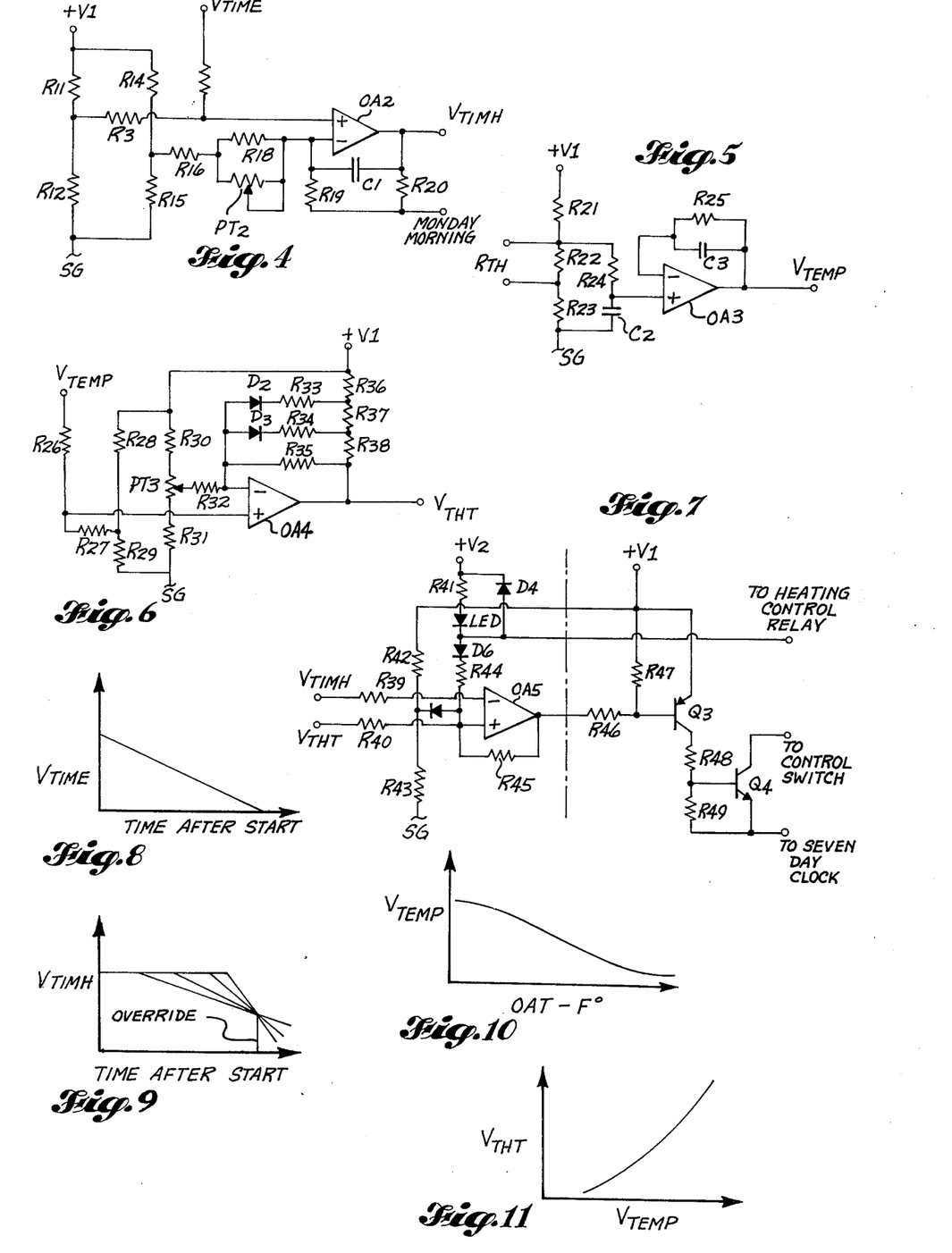
FIG. 4 is a schematic diagram of an adjustable $V_{TIMH}$ generator suitable for use in the embodiment of the invention illustrated in FIG. 1.
FIG. 5 is a schematic diagram of a $V_{TEMP}$ generator suitable for use in the embodiment of the invention as illustrated in FIG. 1.
FIG. 6 is a schematic diagram of a $V_{THT}$ generator suitable for use in the embodiment of the invention illustrated in FIG. 1.
FIG. 7 is a schematic diagram of a comparator and driver suitable for use in the embodiment of the invention illustrated in FIG. 1.
FIG. 8 is a graph illustrating the transfer function of the $V_{TIME}$ generator.
FIG. 9 is a graph illustrating the transfer function of the adjustable $V_{TIMH}$ generator.
FIG. 10 is a graph illustrating the transfer function of the $V_{TEMP}$ generator.
FIG. 11 is a graph illustrating the transfer function of the $V_{THT}$ generator.

The output of the seven day clock 21 applied to the timer motor control 23 is designated a START-UP signal. The occurrence of this signal causes the timer motor control to apply a start signal to the $V_{TIME}$ generator. The $V_{TIME}$ generator includes a motor connected to drive the movable element of a linear potentiometer. The START-UP signal causes the motor to drive the movable element, and the potentiometer to start generating a linear output signal. As illustrated in FIG. 8 the linear output of the $V_{TIME}$ generator starts at some predetermined voltage level and linearly reduces to zero over some fixed time period. After the motor has driven the potentiometer through a complete cycle of operation, a dead spot is reached. After the potentiometer movable element transverses the dead spot it contacts the beginning of the resistive element at which point it creates a stop signal that terminates energization of the $V_{TIME}$ generator's motor. Thereafter, the next START-UP signal, which occurs the next day, causes the cycle to repeat.

The $V_{TIME}$ signal output of the $V_{TIME}$ generator is applied to the adjustable $V_{TIMH}$ generator. The $V_{TIME}$ signal is electronically conditioned in a discontinuous linear manner by the adjustable $V_{TIMH}$ generator into a $V_{TIMH}$ signal. FIG. 9 illustrates the transfer function of the adjustable $V_{TIMH}$ generator. Initially, the $V_{TIMH}$ signal stays at a fixed level. After a predetermined period it starts to linearly decrease toward zero until the potentiometer movable element reaches the dead spot, at which time it reaches some indeterminate level. Prior to the indeterminate level being reached, an override signal is created in the manner hereinafter described. Hence, the indeterminate level region is of no consequence to this invention. The fixed level period of time is adjustable, preferably in the manner hereinafter described. The $V_{TIMH}$ signal is applied to one input of the comparator 35.

In addition to the time related signal, the comparator 35 also receives a temperature related signal. More specifically, the outdoor wind/temperature sensor 27 is preferably a cooling effect detector that includes a heating element connected to a regulated constant current source. In addition, the outdoor wind/temperature sensor includes a thermistor. The thermistor and the heating element are mounted in a common housing located external to the building. Because of the heating element, the output of the thermistor is a function of both temperature and wind. In one form, the heater raises the ambient temperature of the thermistor by 7° and a 15 mph wind reduces this temperature to approximately 2°.

The output of the outdoor wind/temperature sensor 29 is designated $R_{TH}$ and is applied to the input of the $V_{TEMP}$ generator 31. More specifically, the thermistor is connected across the input of the $V_{TEMP}$ generator. The $V_{TEMP}$ generator, as will be better understood from the following description, includes a suitable resistor network which, in combination with the resistance of the thermistor, produces an output signal which is roughly inversely linear to the sensed wind/temperature condition. This signal, $V_{TEMP}$, is applied to the input of the $V_{THT}$ generator 33. A graph representing the transfer function of the $V_{TEMP}$ generator is illustrated in FIG. 10.

The $V_{THT}$ generator 33 has an exponential transfer function (FIG. 11) and, in accordance therewith, modifies the $V_{TEMP}$ signal into a $V_{THT}$ signal. The $V_{THT}$ signal is applied to the second input of the comparator 35.

The comparator 35 compares the $V_{TIMH}$ signal with the $V_{THT}$ signal and, when these signals are equal, applies a trip signal to the driver 39. The main output of the driver 39 is connected to the control switch 41. The control switch in turn is connected to the occupancy control relay 43 and the heating system control relay 45. A subsidiary output of the driver is also applied through the heating system control relay to the comparator. The subsidiary output sets up a feedback condition that prevents unwanted cycling or hunting should the outdoor wind or temperature change in a manner that negates a prior comparison.

In operation, during unoccupied periods, the heating system control relay 45 is energized and places the heating system of the building in a night mode of operation. In addition, during unoccupied periods, the occupancy control relay, which controls air dampers, for example, is energized and places its related components in a night mode of operation. As will be understood by those skilled in the art, closing air dampers at night and only opening them during periods of occupancy in and of itself results in substantial fuel savings.

When a comparison between the $V_{TIMH}$ and $V_{THT}$ signals occurs, the driver 39 through the control switch 41 deenergizes the heating system control relay 45. Deenergization of this relay places the building in a day mode of operation. Thereafter, the building temperature is brought to the desired building occupancy temperature, which is reached precisely at the time occupancy is to commence. At this time the seven day clock deenergizes the occupancy control relay and applies an override signal to the driver. The override signal causes deenergization of the heating control relay if such action has not occurred as a result of a comparison condition occurring. In other words, when the outputs of the adjustable $V_{TIMH}$ generator and the $V_{THT}$ generator become equal, the comparator causes the heating system control relay 45 to shift from a night to a day mode of operation. The comparison occurs at the precise point in time necessary for the building's heating system to have exactly the right amount of time to bring the building's temperature to the desired level exactly when occupancy commences. Thus, the relationship between the time and temperature related signals creates a morning start-up period just adequate to accomplish the desired objective i.e., raise the building's temperature to a comfortable level. Then, at the time of occupancy, the occupancy control relay 45 shifts to its day mode of operation and allows the air dampers to open and fresh air to be circulated.

Figure 2:
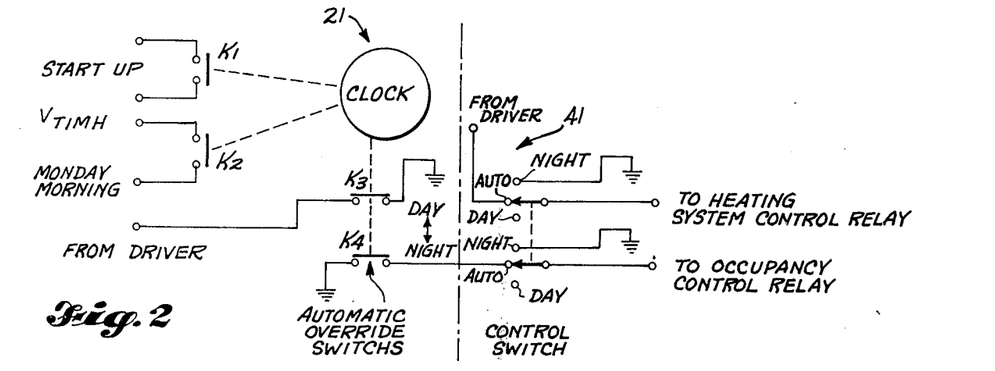
FIG. 2 is a schematic diagram of a seven day clock and a control switch suitable for use in the embodiment of the invention illustrated in FIG. 1.

As stated above, the seven day clock 21 is also adapted to override the driver 39, should the driver not generate a signal adapted to deenergize the heating system control relay prior to building occupancy. For example, if building occupancy is to occur at 8 o'clock in the morning, the seven day clock 21 will generate an override signal at 8 o'clock, if the driver has not generated a deenergization signal prior to that point in time. One method of performing this operation is for a clock tripper to open a serially connected switch at that point in time, as illustrated in FIG. 2 and hereinafter described. The control switch 41 is also adapted to override the system of the invention during, for example, extended vacation periods. It will be appreciated that during such periods it is desirable to maintain the building temperature control system in its night mode of operation. In addition, the control switch is used to "set-up" a particular mode of operation when it is desired to troubleshoot the system, or adjust it.

FIG. 2 is a schematic diagram illustrating a seven day clock 21 and a control switch 41. The seven day clock 21 is illustrated on the left side of FIG. 2 and the control switch 41 is illustrated on the right side.

The seven day clock 21 comprises a clock consisting generally of an AC motor and a gear box adapted to rotate a switch control element or elements (trippers), as is well-known to those skilled in the art. The control element(s) operate, in a timed manner, a plurality of movable switch closure elements which co-operate with sets of contacts designated K1, K2, K3 and K4. The control elements and contacts are formed such that K1 and K2 are normally open and K3 and K4 are normally closed at night. Contacts K1 are connected to a pair of terminals designated START-UP and are adapted to be closed once each day at some particular point in time, such as seven hours before building occupancy, for example. Closing contacts K1 causes the START-UP signal, as illustrated in FIG. 1, to be applied to the timer motor control 23.

Contacts K2 are connected to a pair of terminals designated $V_{TIMH}$ and MONDAY, respectively. These terminals are connected to the adjustable $V_{TIMH}$ generator and apply to that generator a MONDAY morning adjustment signal adapted to modify its transfer function in the manner hereinafter described. These contacts are closed once each seven day period, i.e., on Monday morning. Alternately, as noted above, the seven day clock could be replaced with a 24 hour clock. If so, and the MONDAY morning function is desired, a "skip-a-day" feature must form part of the 24 hour clock.

Contacts K3 and K4 form automatic override switches which are adapted to be opened once a day, at the particular point in time occupancy is to commence, at 8 o'clock in the morning, for example. One contact of the K3 set is connected to a terminal designated FROM DRIVER and the other contact is connected to ground. One contact of the K4 set is connected to ground and the other is connected to the control switch 41 in the manner hereinafter described.

The control switch 41 comprises a ganged double pole, three position switch having "night," "auto" and "day" positions. The night positions are connected to ground. The day positions are illustrated as unconnected; however, it will be appreciated from this description that these positions are to be connected to suitable voltage sources (or ground), or left unconnected, as necessary, to maintain the occupancy and thermostat control relays 43 and 45 in their respective day and night modes when the control switch is in a related mode. The auto position of the upper set of switch terminals is connected to a terminal designated FROM DRIVER and the auto position of the lower set is connected to the appropriate terminal of the K4 set of terminals. The movable element of the upper portion of control switch 41 is connected to the heating system control relay and the movable element of the lower portion is connected to the occupancy control relay.

Figure 3:
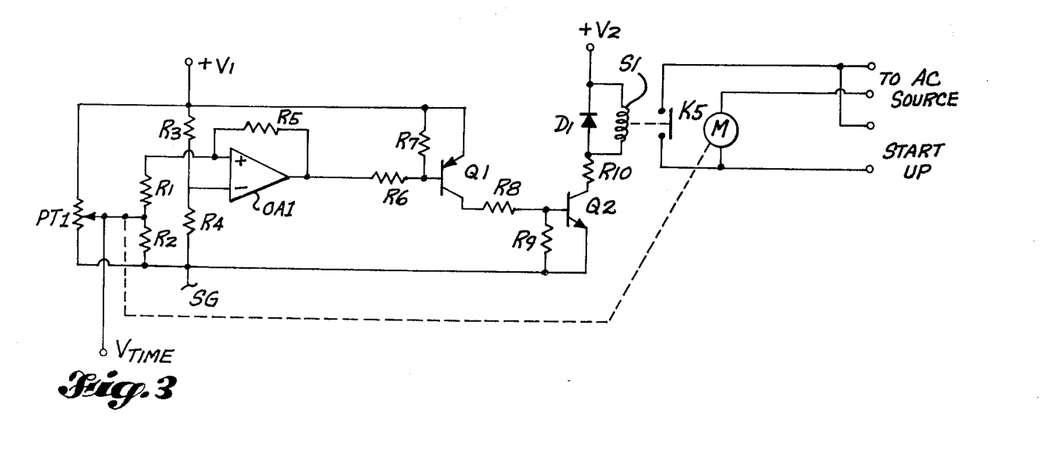
FIG. 3 is a schematic diagram of a timer motor control and a $V_{TIME}$ generator suitable for use in the embodiment of the invention illustrated in FIG. 1.

FIG. 3 is a schematic diagram illustrating a timer motor control 23 and a $V_{TIME}$ generator 25. In essence, the $V_{TIME}$ generator comprises a linear potentiometer designated PT1 driven by the shaft of a motor designated M, preferably through a gear box (not illustrated). The remaining portion of the circuit illustrated in FIG. 3 in essence forms the timer motor control 23. Thus, the timer motor control 23 comprises ten resistors designated R1–R10; a PNP transistor designated Q1; and NPN transistor designated Q2; a diode designated D1; a relay coil designated S1 having a set of contacts designated K5; and, an operational amplifier designated OA1.

The START-UP terminals of the seven day clock 21 (FIG. 2) are connected across K5. One side of the motor is connected to one of the K5 set of contacts. The other K5 contact and the other side of the motor are connected to a pair of terminals designated TO AC SOURCE. AC power is applied to these terminals by an AC power source (not shown). The shaft of the motor M is connected (preferably through a gear box), as indicated by the dashed line, to the movable element of PT1. The movable element of PT1 is also connected to a terminal designated $V_{TIME}$. Thus, the $V_{TIME}$ signal applied to the adjustable $V_{TIMH}$ generator 27 is derived from PT1. As indicated above and illustrated in FIG. 8, the motor moves the movable element of PT1 in a manner such that the $V_{TIME}$ signal is inversely linear. It should be noted here that the motor M can be eliminated if desired and the linear potentiometer PT1 operated directly by the seven day clock so as to complete a cycle of operation during some prescribed time period of each 24 hour period, if desired.

PT1 is connected between a regulated voltage source, designated +V1, and signal ground, designated SG. R1 and R2 are connected between the non-inverting (+) input of OA1 and SG. The junction between R1 and R2 is connected to the movable element of PT1. R3 and R4 are connected between +V1 and SG. The junction between R3 and R4 is connected to the inverting (−) input of OA1. R5 is connected between the output of OA1 and its non-inverting input. The output of OA1 is also connected through R6 to the base of Q1. The emitter of Q1 is connected to +V1, and R7 is connected between −V1 and the base of Q1. The collector of Q1 is connected through R8 in series with R9 to SG. The junction between R8 and R9 is connected to the base of Q2. The emitter of Q2 is connected to SG. The collector of Q2 is connected through R10 to the anode of D1. The cathode of D1 is connected to an unregulated voltage source designated +V2. S1 is connected in parallel with D1.

In operation, when contacts K1 of the seven day clock (FIG. 2) are closed, AC power is applied to the motor M. As the shaft of the motor starts to rotate, the movable terminal of PT1 leaves the extreme end of its resistive element and applies a positive, linearly decreasing, voltage to the non-inverting input of OA1. More specifically, as illustrated in FIG. 8, the $V_{TIME}$ signal linearly decreases from a maximum voltage level to zero. Starting of the motor M starts this voltage decreasing from its maximum level toward zero. After PT1 travels some distance along its resistive element, for example 5% of its total path of travel, the $V_{TIME}$ signal decreases to a value which when applied to the non-inverting input of OA1 causes OA1 to gate Q1 on. Q1, in turn, gates Q2 on causing a current flow through S1 and closing contacts K5. Because contacts K5 are now closed, AC power continues to be applied to the motor M even though contacts K1 of the seven day clock thereafter open, as they do when the operative clock tripper passes its K1 position. The motor is now energized for a complete cycle of operation. The cycle terminates when the movable element of PT1 passes through a dead spot and just contacts its fixed resistive element such that $V_{TIME}$ rises to its maximum value. When this situation occurs, the output of OA1 turns Q1 and, thus, Q2 off. D1 is provided to prevent inductive voltage spikes from injuring Q2.

FIG. 4 is a schematic diagram illustrating an adjustable $V_{TIMH}$ generator suitable for use in the embodiment of the invention illustrated in FIG. 1 and comprises: 10 resistors designated R11–R20; a potentiometer designated PT2; a capacitor designated C1; and, an operational amplifier designated OA2. R11 and R12 are connected in series between +V1 and SG. The junction between R11 and R12 is connected through R13 to the non-inverting (+) input of OA2. The non-inverting input of OA2 also receives the $V_{TIME}$ signal via R17. Series connected R14 and R15 are connected in parallel with R11 and R12. The junction between R14 and R15 is connected to one end of R16. R18 and PT2 are connected in parallel and between the other end of R16 and the inverting (−) input of OA2. PT2 is connected as a variable resistor. The output of OA2 is connected to an output terminal designated $V_{TIMH}$. The $V_{TIMH}$ terminal is connected to the comparator 35 and to the $V_{TIMH}$ terminal of the seven day clock (FIG. 2). C1 is connected between the inverting input and the output of OA2. R20 and R19 are connected in series with the series combination being connected in parallel with C1. The junction between R19 and R20 is connected to an output terminal designated MONDAY. The MONDAY terminal is connected to the MONDAY terminal of the seven day clock 21.

In essence, the $V_{TIMH}$ generator is an amplifier circuit having an amplification characteristic (transfer function) of the type illustrated in FIG. 9. As discussed above the characteristic is such that $V_{TIMH}$ proceeds at a constant value for a period of time. Thereafter the adjustable amplification causes $V_{TIMH}$ to decrease in a linear manner until PT1 reaches its dead spot, at which point $V_{TIMH}$ is indeterminate. Thus, when the $V_{TIME}$ signal reduces to zero, the $V_{TIMH}$ signal reduces to a low value. The break point between constant voltage level and decaying voltage level, and the rate of decay, is generally dependent on the adjustment of PT2 and the values of R14, R15, R16, R19, and R20 for a particular $V_{TIME}$ signal. In this regard, PT2 provides a tailoring adjustment which adjusts the slope (amplification) of the $V_{TIMH}$ signal in terms of volts per hour. In one actual embodiment of the invention, $V_{TIMH}$ starts at 9 volts and decays to precisely 3 volts at the time of occupancy. At the time of occupancy, the override signal occurs which prevents the $V_{TIMH}$ signal from having any further effect. It will be appreciated that because the adjustable $V_{TIMH}$ generator can be readily adjusted by PT2, it is basically adapted to properly condition the $V_{TIME}$ signal and scale it in terms of the characteristics of the building whose temperature is to be controlled by a particular embodiment of the invention. Obviously, the main building characteristics involved are its insulation and massiveness, even though other factors, such as location, exposure, and shape, may be involved.

Many buildings are not occupied during weekends and, thus, it is desirable to maintain the temperature control system of such buildings in its night mode of operation over the entire weekend. However, this arrangement may create problems in that the normal decay time of the adjustable $V_{TIMH}$ generator may be inadequate on Monday morning due to the long weekend cooldown. The invention provides a means for overcoming this problem. Specifically, once each seven day period, on Monday morning, contacts K2 (FIG. 2) are closed, and maintained closed up to occupancy by a suitable cam connected to the shaft of the clock 47, for example. Closure of contacts K2 shorts R20 which changes the decay rate in a manner adapted to compensate for the weekend night mode of operation.

FIG. 5 is a schematic diagram illustrating a $V_{TEMP}$ generator suitable for use in the embodiment of the invention illustrated in FIG. 1 and comprises: five resistors designated R21–R25; two capacitors designated C2 and C3; and, an operational amplifier designated OA3. R21, R22 and R23 are connected in series in that order between +V1 and SG. A pair of input terminals designated $R_{TH}$ are connected across R22. The $R_{TH}$ terminals are connected across the thermistor forming a portion of the outdoor wind/temperature sensor 29 (FIG. 1), discussed above. R24 is connected from the junction between R21 and R22 to the non-inverting (+) input of OA3. C2 is connected from the non-inverting input of OA3 to SG. The output of OA3 is connected through C3 to its inverting (−) input. R25 is connected in parallel with C3. The output of OA3 is also connected to an output terminal designated $V_{TEMP}$.

The $V_{TEMP}$ generator, as will be understood from the foregoing circuit description, basically consists of a unity gain feedback operational amplifier with a suitable resistor network. The resistor network is formed and connected to the operational amplifier in a manner that causes the thermistor resistance to be roughly linearly converted to voltage. Thus, the $V_{TEMP}$ signal is, as illustrated in FIG. 10, a rough linear inversion of the wind modified outdoor temperature.

FIG. 6 is a schematic diagram illustrating a $V_{THT}$ generator suitable for use in the embodiment of the invention illustrated in FIG. 1 and comprises: 13 resistors designated R26–R38; a potentiometer designated PT3; two diodes designated D2 and D3; and, an operational amplifier designated OA4.

An input terminal, designated $V_{TEMP}$ and connected to receive the $V_{TEMP}$ output of the $V_{TEMP}$ generator illustrated in FIG. 5, is connected through R26 to the non-inverting (+) input of OA4. R28 and R29 are connected in series between +V1 and SG. The junction between R28 and R29 is connected through R27 to the non-inverting output of OA4. R30, PT3 and R31 are also connected in series in that order between +V1 and SG. The movable element of PT3 is connected through R32 to the inverting (−) input of OA4. +V1 is connected through R36, R37 and R38 connected in series in that order to the output of OA4. The inverting input of OA4 is connected through R35 to the output of OA4, and to the anodes of D2 and D3. The cathode of D3 is connected through R33 to the junction between R36 and R37. The cathode of D3 is connected through R34 to the junction between R37 and R38. Finally, the output of OA4 is connected to an output terminal designated $V_{THT}$.

The purpose of the $V_{THT}$ generator is to convert the $V_{TEMP}$ signal into a $V_{THT}$ signal in an exponential manner that is characteristic of the time required to bring the temperature of the building to the desired temperature level. More specifically, it has been found that the time necessary to bring a building's temperature to a predetermined level from some other level is an exponential function of the wind modified outdoor temperature. The $V_{THT}$ generator is basically an operational amplifier adapted to modify the $V_{TEMP}$ signal in an exponential manner (using straight line approximations), as illustrated in FIG. 11. Thus, the output ($V_{THT}$) is a signal whose rate change is exponential in a manner that is both related to outside temperature and the rate or time necessary to bring the related building's temperature to a comfortable level. The exponential nonlinearity is obtained by the diode-clamped resistor networks connected in the feedback path of OA4 as is well known in the analog computer art. PT3 allows the circuit to be adjusted for different circuit component characteristics.

FIG. 7 is a schematic diagram of a comparator and driver suitable for use in the embodiment of the invention illustrated in FIG. 1. The comparator is generally illustrated on the left side of FIG. 7 and the driver is generally illustrated on the right side.

The comparator illustrated in FIG. 7 comprises: seven resistors designated R39–R45; three diodes designated D4, D5 and D6; a light-emitting diode designated LED; and, an operational amplifier designated OA5.

The $V_{TIMH}$ signal generated by the adjustable $V_{TIMH}$ generator 27 is connected through R39 to the inverting (−) input of OA5. The $V_{THT}$ signal generated by the $V_{THT}$ generator is connected through R40 to the non-inverting (+) input of OA5. R41 is connected between +V2 and the anode of LED. The cathode of LED is connected to the anode of D6. The cathode of D6 is connected through R44 to the non-inverting input of OA5.

R42 and R43 are connected in series between +V1 and SG. The cathode of D5 is connected to the junction between R42 and R43 and the anode of D5 is connected to the non-inverting input of OA5. The junction between LED and D6 is connected to the anode of D4, and the cathode of D4 is connected to +V2. R45 is connected between the non-inverting input of OA5 and its output.

As will be appreciated by those skilled in the art from the foregoing circuit description, OA5 functions as an operational amplifier comparator. Because the $V_{TIMH}$ signals starts at a relatively high level and then decreases, and because the $V_{THT}$ signal is at some fixed level determined by the wind modified outside temperature, the output of OA5 starts at a low positive level and switches to a high level at the point where $V_{TIMH}$ becomes less than $V_{THT}$. When this condition occurs, the driver is switched in the manner hereinafter described.

The driver illustrated in FIG. 7 comprises: four resistors designated R46–R49; a PNP transistor designated Q3; and, an NPN transistor designated Q4. R46 is connected between the output of OA5 and the base of Q3. The emitter of Q3 is connected to +V1 and R47 is connected between +V1 and the base of Q3. The collector of Q3 is connected through R48 in series with R49 to chassis ground. The junction between R48 and R49 is connected to the base of Q4. The emitter of Q4 is connected to a terminal designated TO SEVEN DAY CLOCK. This terminal is connected to the appropriate terminal of K3 of the seven day clock. The collector of Q4 is connected to a terminal designated TO CONTROL SWITCH. This terminal is connected to the auto terminal of the upper portion of the control switch 41 and, via that switch, to the heating system control relay in the manner illustrated in FIG. 2 and previously described.

In operation, when $V_{THT} = V_{TIMH}$ and the output of OA5 switches to a high level, Q3 switches from an on state to an off state. Turning off Q3 turns off Q4 to, in essence, deenergize the heating system control relay whereby that relay moves to it day mode of operation.

A further signal is applied to the heating system control relay to prevent system cycling. The further signal is derived from the anode of D4 and is applied through D6 and R44 to the non-inverting input of OA5. In essence this further signal locks the driver in its open state once it has been switched and so as to deenergize the heating system control relay. D4 is provided to prevent inductive spikes from harming Q4 or the LED, and LED is provided for troubleshooting purposes to indicate when the heating system control relay is energized.

Figure 12:
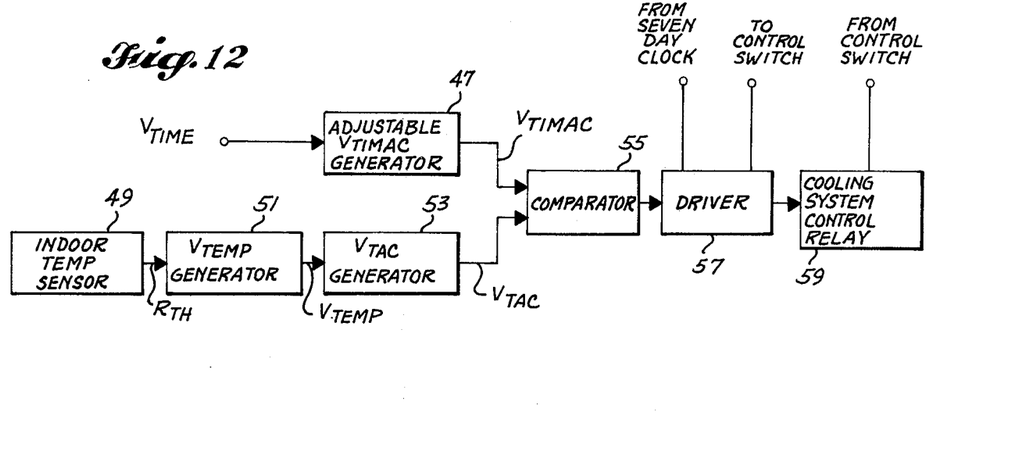
FIG. 12 is a block diagram of addendum to, or replacement for a portion of, the embodiment of the invention illustrated in FIG. 1 to create an embodiment of the invention suitable for controlling the cooling system of a building; and, FIG. 13 is a graph illustrating the transfer function of the $V_{TAC}$ generator illustrated in FIG. 12.

FIG. 12 is a block diagram of a modification to, or a replacement for a portion of, the heating system embodiment of the invention illustrated in FIG. 1, depending upon whether a building's heating and cooling system, or just its cooling system is to be controlled. In any event, the FIG. 12 block diagram comprises: an adjustable $V_{TIMAC}$ generator 47; an indoor temperature sensor 49; a $V_{TEMP}$ generator 51; a $V_{TAC}$ generator 53; a comparator 55; a driver 57; and, a cooling system control relay 59.

The $V_{TIME}$ output of the $V_{TIME}$ generator (FIG. 1) is connected to the input of the adjustable $V_{TIMAC}$ generator 47. The $V_{TIMAC}$ generator has a discontinuous linear transfer function similar to the transfer function (FIG. 9) of the $V_{TIMH}$ generator (FIG. 4); thus, it can be controlled by a MONDAY signal in the same manner as the previously described $V_{TIMH}$ generator. Moreover, it can be formed in a generally similar manner. The output of the adjustable $V_{TIMAC}$ generator is a signal designated $V_{TIMAC}$ and is applied to one input of the comparator 55.

Preferably the indoor temperature sensor 49 is formed of a thermistor having a resistance that inversely varies with temperature. This resistance, designated $R_{TH}$, is connected across the $V_{TEMP}$ generator 57 to control the output thereof in the same manner as the resistive output of the outdoor wind/temperature sensor 29 controlled its associated $V_{TEMP}$ generator 31. Also, the transfer function of the $V_{TEMP}$ generator 51 illustrated in FIG. 12 is generally the same as the transfer function of the $V_{TEMP}$ generator 31 illustrated in FIG. 1.

Figure 13:
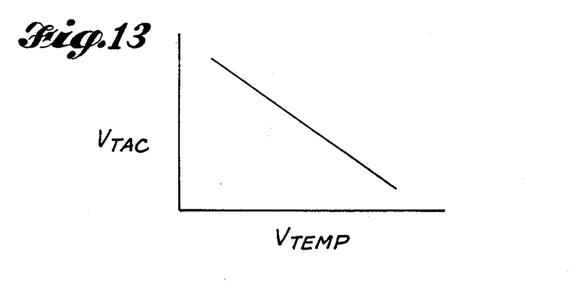

The output of the $V_{TEMP}$ generator 51 is a signal designated $V_{TEMP}$ and is applied to the input of the $V_{TAC}$ generator. While the $V_{TAC}$ generator may have an exponential transfer function (similar to that of the $V_{THT}$ generator), preferably it has an inversely linear transfer function as illustrated in FIG. 13. The output of the $V_{TAC}$ generator is a signal designated $V_{TAC}$ and is applied to the second input of the comparator 55.

The comparator compares its two inputs and in accordance therewith applies a signal to the driver 57. The driver in turn applies a main control signal through the control switch to the cooling system control relay. In addition, the driver applies a subsidiary signal to the cooling system control relay. As with the heating system embodiment, the subsidiary signal is adapted to prevent the cooling system control relay from cycling once it has been deenergized by a main control signal.

Since the nature and operation of the various subsystems illustrated in FIG. 12 are generally identical to the nature and operation of their equivalent subsystems illustrated in FIG. 1 (except for the $V_{TAC}$ generator whose transfer function is generally described above and illustrated in FIG. 13), they will not be further described here. It should be noted however that the cooling system control illustrated in FIG. 12 can be either added to the heating system control illustrated in FIG. 1 (where both heating and cooling system control is desired) or used to replace its equivalent subsystems (where only cooling system control is desired) depending upon the intended environment of use.

It will be appreciated from the foregoing description of preferred embodiments that the invention comprises an essentially entirely electronic system for controlling the activation of a building temperature control system. The system is adapted to either control the heating, cooling, or both, control systems of a building, so that the building's temperature can be efficiently brought from some undesired (night) level to a desired (day) level precisely at the time building occupancy is to commence. The invention achieves this result by varying the morning start-up period in accordance with external wind, external and internal temperature and building characteristics. Because the invention is mainly formed of electronic components, it is relatively easy to adjust or modify to compensate for a particular set of building characteristics. Moreover, it is reliable and, therefore, suitable for widespread use.

While a preferred embodiment of the invention has been illustrated and described, it will be appreciated by those skilled in the art and others that various changes can be made therein without departing from the spirit and scope of the invention. For example, different types of operational amplifier circuits can be utilized to create the desired transfer functions. Further, the entire invention can be formed in a single, large scale integrated circuit, rather than from discrete components and operational amplifiers, as illustrated and described. Also, the occupancy and heating or cooling system control relays can be maintained energized in their day and deenergized in their night modes of operation, rather than vice versa, as described. Further, the clock could be an electronic digital clock, if desired. Such a clock, in combination with a digital-to-analog converter, can be used to generate the desired time signal, as will be recognized by those skilled in the digital logic art. Hence, the invention can be practiced otherwise than as specifically described herein.

The embodiments of the invention in which an exclusive property or privilege is claimed are defined as follows:

1. An electronic morning start-up control for a building temperature control system comprising:
   1. electronic time signal generating means for generating a modified time signal having either one of at least two predetermined forms, said electronic time signal generating means including:
      a. a time signal generator for generating: (i) a time signal at predetermined intervals, and, (ii) a control signal at predetermined intervals different than said time signal intervals; and,
      b. a signal modifier connected to said time signal generator for receiving said time signal and said control signal and for modifying said time signal such that: (i) the first of said at least two predetermined forms of said modified time signal occurs in the absence of a control signal occurring simultaneously with the ocurrence of a time signal; and, (ii) the other of said at least two predetermined forms of said modified time signal occurs when a control signal occurs simultaneously with the occurrence of a time signal;
   2. temperature sensing means for sensing the temperature in predetermined regions related to the building whose temperature is to be controlled and for generating a temperature signal related thereto;
   3. electronic temperature signal modifying means connected to said temperature sensing means for electronically modifying said temperature signal to create a modified temperature signal;
   4. comparison means connected to said electronic time signal generating means and to said electronic temperature signal modifying means for comparing said modified time signal with said modified temperature signal and for generating an output signal having a predetermined state when said modified time signal and said modified temperature signal compare in a predetermined manner; and,
   5. control signal means connected to said comparison means for creating a control signal adapted to shift the building temperature control system of said building whose temperature is to be controlled from one mode of operation to another mode of operation when the output of said comparison means indicates that said modified time signal and said modified temperature signal compare in said predetermined manner.

2. An electronic morning start-up control for a building temperature control system as claimed in claim 1 wherein:
   said time signal generator includes a linear electronic signal generator suitable for generating a linear electronic signal spanning a predetermined time period, said linear electronic signal forming said time signal; and,
   said signal modified is an adjustable signal generator connected to the output of said linear signal generator for modifying the output of said linear signal generator in a discontinuous linear manner such that both forms of said modified time signal have a linearly decreasing region.

3. An electronic morning start-up control for a building temperature control system as claimed in claim 2 wherein both forms of said modified time signal have a constant output followed by a linearly decreasing region.

4. An electronic morning start-up control for a building temperature control system as claimed in claim 3 wherein:
   said time signal generator also includes a cyclic clock and a timer motor, said cyclic clock energizing said timer motor once each 24 hour period in which it is desired to switch said building temperature control system from said one mode of operation to said other mode of operation; and,
   said linear electronic signal generator includes a linear potentiometer having a movable element that defines a cycle of operation, said movable element connected to said timer motor in a manner such that said timer motor moves said movable element through a cycle of operation once each time said timer motor is activated by said cyclic clock, the signal occurring on said movable element forming said linear electronic signal, whereby said linear electronic signal is generated once each 24 hour period.

5. An electronic morning start-up control for a building temperature control system as claimed in claim 4 wherein said cyclic clock is also a seven-day clock that generates a control output once each seven-day period, said control output forming said control signal, whereby said control signal occurs once each seven-day period.

6. An electronic morning start-up control for a building temperature control system as claimed in claim 5 wherein said temperature sensing means senses the temperature of the environment surrounding said building and includes a thermistor and a means for heating the environment surrounding said thermistor whereby the voltage drop across said thermistor is related both to the wind and the temperature of the environment surrounding said building whose temperature is to be controlled, said voltage drop across said thermistor forming said temperature signal.

7. An electronic morning start-up control for a building temperature control system as claimed in claim 6 wherein said electronic temperature signal modifying means comprises:
 a temperature generator connected across said thermistor so as to sense said temperature signal, said temperature generator formed so as to convert said temperature signal and thereby form a converted temperature signal; and,
 a temperature modifying generator connected to the output of said temperature generator for receiving said converted temperature signal and for modifying said converted temperature signal in a nonlinear manner, the nonlinear output of said temperature modifying generator being connected to said comparator.

8. An electronic morning start-up control for a building temperature control system as claimed in claim 7 wherein said temperature modifying generator modifies said converted temperature signal in an exponential manner.

9. An electronic morning start-up control for a building temperature control system as claimed in claim 8 wherein said control signal means includes:
 a driver circuit connected to the output of said comparator; and,
 a heating system control relay connected to the output of said driver circuit.

10. An electronic morning start-up control for a building temperature control system as claimed in claim 9 wherein said seven day clock includes a switch connected in series between the output of said driver and said heating system control relay.

11. An electronic morning start-up control for a building temperature control system as claimed in claim 10 including a control switch connected between said driver and said heating system control relay.

12. An electronic morning start-up control for a building temperature control system as claimed in claim 1 wherein said temperature sensing means senses the temperature of the environment surrounding said building and includes a thermistor and a means for heating the environment surrounding said thermistor whereby the voltage drop across said thermistor is related both to the wind and the temperature of the environment surrounding said building whose temperature is to be controlled, said voltage drop across said thermister forming said temperature signal.

13. An electronic morning start-up control for a building temperature control system as claimed in claim 12 wherein said electronic temperature signal modifying means comprises:
 a temperature generator connected across said thermistor so as to sense said temperature signal, said temperature generator formed so as to convert said temperature signal and thereby form a converted temperature signal; and,
 a temperature modifying generator connected to the output of said temperature generator for receiving said converted temperature signal and for modifying said converted temperature signal in a nonlinear manner, the nonlinear output of said temperature modifying generator being connected to said comparator.

14. An electronic morning start-up control for a building temperature control system as claimed in claim 13 wherein said temperature modifying generator modifies said converted temperature signal in an exponential manner.

15. An electronic morning start-up control for a building temperature control system as claimed in claim 5 wherein said temperature sensing means senses the internal temperature of said building and includes a thermistor, the voltage drop across said thermistor forming said temperature signal.

16. An electronic morning start-up control for a building temperature control system as claimed in claim 15 wherein said electronic temperature signal modifying means comprises:
 a temperature generator connected across said thermistor so as to sense said temperature signal, said temperature generator formed so as to convert said temperature signal and thereby form a converted temperature signal; and,
 a temperature modifying generator connected to the output of said temperature generator for receiving said converted temperature signal and for modifying said converted temperature signal in a predetermined manner, the output of said temperature modifying generator being connected to said comparator.

17. An electronic morning start-up control for a building temperature control system as claimed in claim 16 wherein said temperature modifying generator modifies said converted temperature signal in an inverted linear manner.

18. An electronic morning start-up control for a building temperature control as claimed in claim 17 wherein said control signal means includes:
 a driver circuit connected to the output of said comparator; and,
 a cooling system control relay connected to the output of said driver circuit.

19. An electronic morning start-up control for a building temperature control system as claimed in claim 15 wherein said seven day clock includes a switch connected in series between the output of said driver and said cooling system control relay.

20. Am electronic morning start-up control for a building temperature control system as claimed in claim 19 including a control switch connected between said driver and said cooling system control relay.

21. An electronic morning start-up control for a building temperature control system as claimed in claim 1 wherein said temperature sensing means senses the temperature of said building and includes a thermistor, the voltage drop across said thermistor forming said temperature signal.

22. An electronic morning start-up control for a building temperature control system comprising:
 1. electronic time signal generating means for electronically generating a time signal having a predetermined function, said electronic time signal generating means including an adjustable signal modifier adapted to modify said time signal in a manner related to the adjustment of said adjustable signal modifier;

2. temperature sensing means for sensing the temperature in predetermined regions related to the building whose temperature is to be controlled and for generating a temperature signal related thereto;

3. electronic temperature signal modifying means connected to said temperature sensing means for electronically modifying said temperature signal to create a modified temperature signal, said electronic temperature signal modifying means including a temperature modifying generator connected to receive said temperature signal for modifying said temperature in an exponential manner to create said modified temperature signal;

4. comparison means connected to said electronic time signal generating means and to said temperature modifying generator for comparing said time signal with said modified temperature signal and for generating an output signal having a predetermined state when said time signal and said modified temperature signal compare in a predetermined manner; and, 5. control signal means connected to said comparison means for creating a control signal adapted to shift the building temperature control system of said building whose temperature is to be controlled from one mode of operation to another mode of operation when the output of said comparison means indicates that said time signal and said modified temperature signal compare in said predetermined manner.

23. An electronic morning start-up control for a building temperature control system as claimed in claim 19 wherein said temperature sensing means senses the temperature of the environment surrounding said building and includes a thermistor and a means for heating the environment surrounding said thermistor whereby the voltage drop across said thermistor is related both to the wind and the temperature of environment surrounding said building whose temperature is to be controlled, said voltage drop across said thermistor forming temperature signal.

24. An electronic morning start-up control for a building temperature control system as claimed in claim 23 wherein:
said electronic temperature signal modifying means also includes a temperature generator connected across said thermistor so as to sense said temperature signal, said temperature generator formed so as to convert said temperature signal and thereby form a converted temperature signal; and,
said temperature modifying generator is connected to the output of said temperature generator for receiving said converted temperature signal and for modifying said converted temperature signal in said exponential manner, the exponential output of said temperature modifying generator being connected to said comparator.

25. An electronic morning start-up control for a building temperature control system comprising:

1. electronic time signal generating means for electronically generating a time signal having a predetermined function, said electronic time signal generating means including:
   a. a linear electronic signal generator suitable for generating a linear electronic signal spanning a predetermined time period; and,
   b. an adjustable signal generator connected to the output of said linear signal generator for modifying the output of said linear signal generator in a discontinuous linear manner so as to create a time signal having a linearly decreasing region;

2. temperature sensing means for sensing the internal temperature of said building whose temperature is to be controlled and for generating a temperature signal related thereto, said temperature sensing means including a thermistor, the voltage drop across said thermistor forming said temperature signal;

3. electronic temperature signal modifying means connected to said temperature sensing means for electronically modifying said temperature signal to create a modified temperature signal;

4. comparison means connected to said electronic time signal generating means and to said electronic temperature signal modifying means for comparing said time signal with said modified temperature signal and for generating an output signal having a predetermined state when said time signal and said modified temperature signal compare in a predetermined manner; and, 5. control signal means connected to said comparison means for creating a control signal adapted to shift the building temperature control system of said building whose temperature is to be controlled from one mode of operation to another mode of operation when the output of said comparison means indicates that said time signal and said modified temperature signal compare in said predetermined manner.

26. An electronic morning start-up control for a building temperature control system as claimed in claim 25 wherein said electronic temperature signal modifying means comprises:
a temperature generator connected across said thermistor so as to sense said temperature signal, said temperature generator formed so as to convert said temperature signal and thereby form a converted temperature signal; and,
a temperature modifying generator connected to the output of said temperature generator for receiving said converted temperature signal and for modifying said converted temperature signal in a predetermined manner, the output of said temperature modifying generator being connected to said comparator.

27. An electronic morning start-up control for a building temperature control system as claimed in claim 26 wherein said temperature modifying generator modifies said converted temperature signal in an inverted linear manner.

28. In a morning start-up control system for controlling the shifting of a building temperature control system from one mode of operation to another mode of operation so that the temperature of said building is at some predetermined level at some predetermined time each 24 hour period by comparing a temperature related signal with a time related signal and causing said shifting to occur when said temperature related signal and said time related signal compare in a predetermined manner, the improvement comprising modifying means for modifying said morning start-up control system at least once each seven-day period in a manner such that said shift occurs when said temperature related signal and said time related signal compare in a different predetermined manner.

29. The improvement claimed in claim 28 wherein said modifying means includes means for modifying said time signal.

30. The improvement claimed in claim 29 wherein said time signal is a discontinuous linear signal having a linearly decreasing region and wherein the rate of change of said linearly decreasing region is changed by said modifying means.

* * * * *

UNITED STATES PATENT AND TRADEMARK OFFICE
CERTIFICATE OF CORRECTION

PATENT NO. : 3,964,676
DATED : June 22, 1976
INVENTOR(S) : Albert H. Rooks

It is certified that error appears in the above-identified patent and that said Letters Patent are hereby corrected as shown below:

Column 2, line 10, cancel "sensitve" and insert --sensitive--;
line 47, cancel "buildiing" and insert --building.

Column 16, line 49, cancel "15" and insert --18--;
line 52, cancel "Am" and insert --An--.

Column 17, line 35, cancel "19" and insert --22--.

Signed and Sealed this

Thirtieth Day of November 1976

[SEAL]

Attest:

RUTH C. MASON
*Attesting Officer*

C. MARSHALL DANN
*Commissioner of Patents and Trademarks*